(12) United States Patent
Lewis (10) Patent No.: US 7,925,376 B2
(45) Date of Patent: Apr. 12, 2011

(54) DUMP STATION APPARATUS AND METHOD FOR FILLING STOCK ORDERS

(75) Inventor: J. Randolph Lewis, Deer Park, IL (US)

(73) Assignee: Walgreen Co., Deerfield, IL (US)

( * ) Notice: Subject to any disclaimer, the term of this patent is extended or adjusted under 35 U.S.C. 154(b) by 934 days.

(21) Appl. No.: 10/047,220

(22) Filed: Jan. 14, 2002

(65) Prior Publication Data
US 2003/0135300 A1 Jul. 17, 2003

(51) Int. Cl.
*G06F 7/00* (2006.01)

(52) U.S. Cl. ........... 700/216; 414/328; 198/370.04; 700/213; 700/228; 186/52; 186/58; 186/2; 186/3

(58) Field of Classification Search .......... 700/213–230, 700/334, 335; 414/328; 198/370.04; 186/35, 186/36, 38, 39, 42, 47–50, 52, 57, 58, 69, 186/2–6, 11, 12, 14, 16, 21, 26, 29, 31–34
See application file for complete search history.

(56) References Cited

U.S. PATENT DOCUMENTS

| | | | |
|---|---|---|---|
| 2,570,918 A | 10/1951 | Chodziesner | |
| 3,042,237 A * | 7/1962 | Dole | 414/421 |
| 3,247,929 A | 4/1966 | Langley | |
| 3,379,321 A | 4/1968 | Weir | |
| 3,416,438 A * | 12/1968 | Weatherly et al. | 100/218 |
| 3,561,619 A | 2/1971 | Weir | |
| 3,616,944 A | 11/1971 | Field | |
| 3,624,792 A | 11/1971 | Lipfert | |
| 4,129,229 A | 12/1978 | Brown | |
| 4,379,669 A | 4/1983 | Wilson | |
| 4,426,189 A | 1/1984 | Weber et al. | |
| 4,501,528 A | 2/1985 | Knapp | |
| 4,509,635 A * | 4/1985 | Emsley et al. | 198/370.03 |
| 4,542,808 A | 9/1985 | Lloyd, Jr. et al. | |
| 4,792,273 A | 12/1988 | Specht | |
| 4,870,799 A | 10/1989 | Bergerioux et al. | |
| 4,874,281 A | 10/1989 | Bergerioux et al. | |
| 4,921,087 A | 5/1990 | Nakamura | |
| 5,022,348 A * | 6/1991 | Bruecker et al. | 119/57.6 |
| 5,230,206 A | 7/1993 | Christ | |
| 5,238,145 A | 8/1993 | Pippin | |
| 5,271,703 A | 12/1993 | Lindqvist et al. | |
| 5,322,406 A | 6/1994 | Pippin et al. | |
| 5,352,081 A | 10/1994 | Tanaka | |

(Continued)

FOREIGN PATENT DOCUMENTS
DE 36 29 293 A1 3/1988
(Continued)

*Primary Examiner* — Jeffrey A Shapiro
(74) *Attorney, Agent, or Firm* — Marshall, Gerstein & Borun LLP (57) ABSTRACT

Dumping stations for receiving articles and discharging the articles into a collection area are disclosed. Each dumping station includes a bin having pick and dump modes. In the pick mode, articles placed in the bin are retained, while in the dump mode, articles are deposited onto a central conveyor. The bin is biased, via gravity, toward the dump mode. A releasable latch is provided for retaining the bin in the pick mode. A processor is operably coupled to the latch and provides a release signal, whereby the latch releases the bin, thereby allowing the bin to switch to the dump mode. The bin may further include a status indicator for assisting a stock worker in identifying the bin in which to place articles.

23 Claims, 6 Drawing Sheets

U.S. PATENT DOCUMENTS

| | | |
|---|---|---|
| 5,363,310 A | 11/1994 | Haj-Ali-Ahmadi et al. |
| 5,395,206 A | 3/1995 | Cerny, Jr. |
| 5,454,688 A | 10/1995 | Pippin |
| 5,509,538 A | 4/1996 | Spindler et al. |
| 5,586,685 A | 12/1996 | Dorner et al. |
| 5,620,102 A | 4/1997 | Finch, Jr. |
| 5,720,157 A | 2/1998 | Ross |
| 5,794,789 A * | 8/1998 | Payson et al. ............... 209/549 |
| 5,839,566 A * | 11/1998 | Bonnet .................... 198/370.04 |
| 5,943,841 A | 8/1999 | Wunscher |
| 6,050,390 A * | 4/2000 | Fortenbery et al. ...... 198/370.03 |
| 6,208,908 B1 * | 3/2001 | Boyd et al. .................. 700/216 |
| 2001/0023377 A1 * | 9/2001 | Wehrung et al. ............. 700/230 |

FOREIGN PATENT DOCUMENTS

| | | |
|---|---|---|
| DE | 39 29 656 A1 | 3/1991 |
| DE | 42 25 041 A1 | 2/1994 |
| EP | 0 282 785 A1 | 9/1988 |
| EP | 0 453 682 A1 | 10/1991 |
| EP | 0 494 014 A1 | 7/1992 |
| EP | 0 515 350 A1 | 11/1992 |
| EP | 0 550 764 A1 | 7/1993 |
| EP | 0 592 729 A1 | 4/1994 |

* cited by examiner

DUMP STATION APPARATUS AND METHOD FOR FILLING STOCK ORDERS

FIELD OF THE INVENTION

The present invention generally relates to systems and methods for filling stock orders and, more particularly, to dump stations used in stock order filling systems and methods for using such dump stations.

BACKGROUND OF THE INVENTION

Order filling or commissioning systems are generally known in the art. Such systems are typically used in environments where a wide variety of articles are stored in inventory, and orders are received requesting specific quantities of selected articles. It is desirable to fulfill the orders as efficiently as possible so that a greater number of orders may be shipped.

In the pick-to-lights system generally known in the art, a central conveyor is positioned between a pair of racks. Each rack has a number of shelves wherein each shelf contains a specific type of article or stock keeping unit (SKU). Light and number displays are located near the front of each shelf. A computer is provided for receiving order information and operating the light and number displays according to the orders received. A box for holding each order is placed on the conveyor. In operation, a sequence of lights is illuminated according to the order information received by the computer. For example, the computer illuminates the light associated with the shelf holding a first article of an order and indicates the desired quantity of that article on the number display. The stock worker walks to the illuminated shelf, picks up the desired quantity of the article, and places the article(s) in the box on the conveyor. Before depositing the article(s) in the box, the stock worker presses a quitting switch which delivers a pick complete signal to the computer. In response to the pick complete signal, the computer illuminates the light associated with the shelf holding the next article on the order list in the same process is repeated. In most pick-to-lights systems, the orders must be filled sequentially, and therefore the process will be delayed by slow stock workers or out-of-stock items.

A commissioning system that allows orders to be filled out of sequence is disclosed in U.S. Pat. No. 5,943,841. This system uses a central conveyor positioned next to a plurality of racks for holding articles. A plurality of intermediate containers are positioned above the conveyor belt for temporarily receiving articles from the racks. Each container has a hinged bottom, and includes a light and a quitting switch. Stock workers are assigned to sections of the racks for transporting articles from the racks to the containers. Each stock worker wears a terminal which displays the selected article and quantity to be picked. A computer is operably connected to the terminals and the containers for directing the stock workers to pick the articles. In operation, each stock worker consults the terminal to determine the selected article and quantity for a current picking operation. The computer also illuminates a light associated with the desired container into which the current pick will be deposited. As a result, each stock worker may fulfill portions of several orders by placing the articles in the indicated containers as directed by the computer. Once all of the portions of an order are deposited in various of the containers, the computer controls the containers so that they discharge their contents at substantially the same section of the advancing conveyor, thereby grouping together a complete order. A similar system is also disclosed in commonly assigned U.S. patent application Ser. No. 09/754,762 entitled "Method and Apparatus for Filling Stock Orders," which is incorporated herein by reference. The intermediate containers disclosed in these documents are, however, overly expensive to build. In addition, it can be difficult for the stock worker to determine which container, of the plurality of containers provided, is intended to receive the articles from the current pick.

DETAILED DESCRIPTION OF THE PREFERRED EMBODIMENTS

Figure 1:
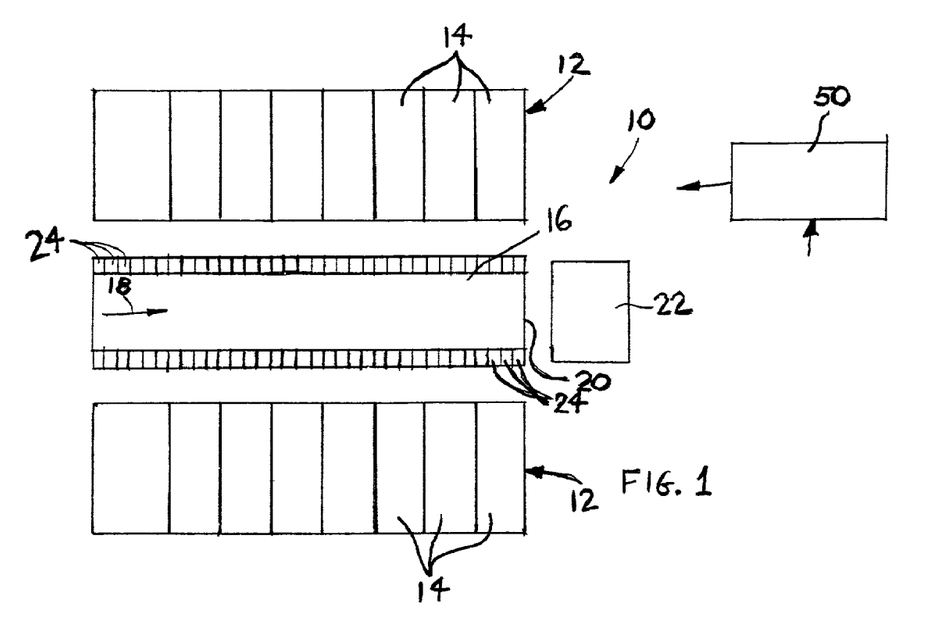
FIG. 1 is a schematic plain view of a portion of a stock order filling apparatus including dumping stations in accordance with the teachings of the present invention.

With reference to FIG. 1, dumping stations 24 in accordance with the present invention are shown for use in an order filling system 10. The order-filling system 10 is described herein for use in a product distribution center. It will be appreciated, however, that the order-filling system 10 may be used in any type of distribution environment that would benefit from the improved article distribution efficiencies taught herein.

Figure 2:
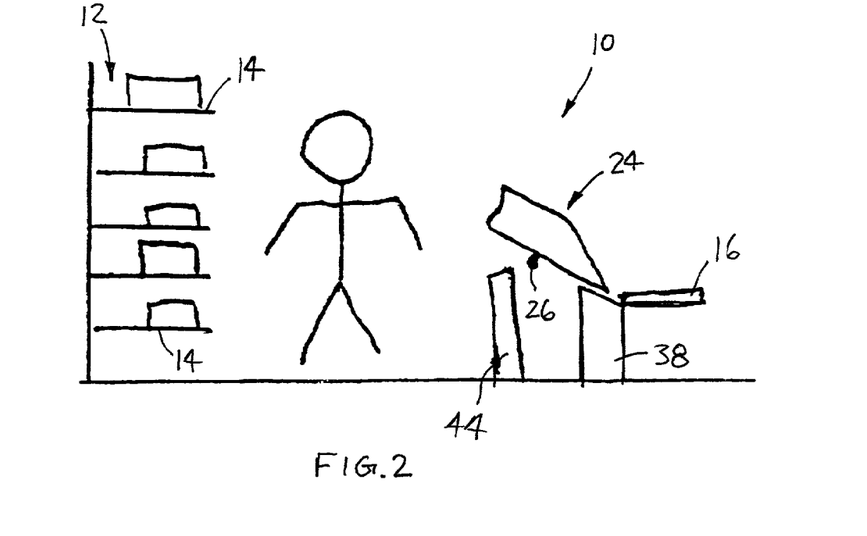
FIG. 2 is a schematic side view of the stock order filling apparatus of FIG. 1.

As best shown in FIGS. 1 and 2, the order-filling system 10 includes a plurality of racks 12 for storing a plurality of articles or stock keeping units (SKUs). Each rack 12 includes multiple shelves 14 for holding the different articles. In a preferred embodiment, the racks 12 comprise flow racks in which the shelves 14 slant downward toward the front, thereby advancing articles toward the front of each shelf 14 as a leading unit is removed.

A central conveyor 16 is disposed between the racks 12 for receiving articles from the shelves 14. The conveyor 16 advances in a direction indicated by arrow 18 toward a discharge end 20 of the conveyor (FIG. 1). A tote 22 may be positioned at the discharge end 20 of the central conveyor 16 for receiving a group of various articles deposited onto a section of the conveyor. As described in greater detail below, the group of articles corresponds to a particular order received at the distribution center. The tote 22 is portable so that it may be transported to a packing and shipping area of the distribution center.

A plurality of dumping stations 24 are positioned above the central conveyor 16 along the length of the conveyor for receiving articles from the racks 12 in the form of full or partial orders. Each dumping station 24 includes a bin 28 having a pick mode, in which articles are placed and held in the bin 28, and a dump mode, in which articles in the bin 28 are discharged onto the conveyor 16. In the embodiment illustrated at FIG. 3, the bin 28 of each dumping station 24 is pivotally mounted on a support shaft 26 extending along substantially the entire length of and parallel to the conveyor 16. Each bin 28 has an article receiving end 30 and discharge end 32. The bin 28 is movable on the support shaft 26 between a dump position (corresponding to the dump mode), in which the discharge end 32 is positioned proximal to the central conveyor 16, and a pick position (corresponding to the pick mode), in which a top of the bin 28 is rotated away from the conveyor 16 (as illustrated in phantom lines at FIG. 3). Accordingly, it will be understood that the bin 28 in the pick position will retain articles deposited therein. In contrast, when the bin 28 is in the dump position, the articles will move toward the discharge end 32 and will ultimately be deposited onto a collection area, such as the conveyor 16.

Figure 3:
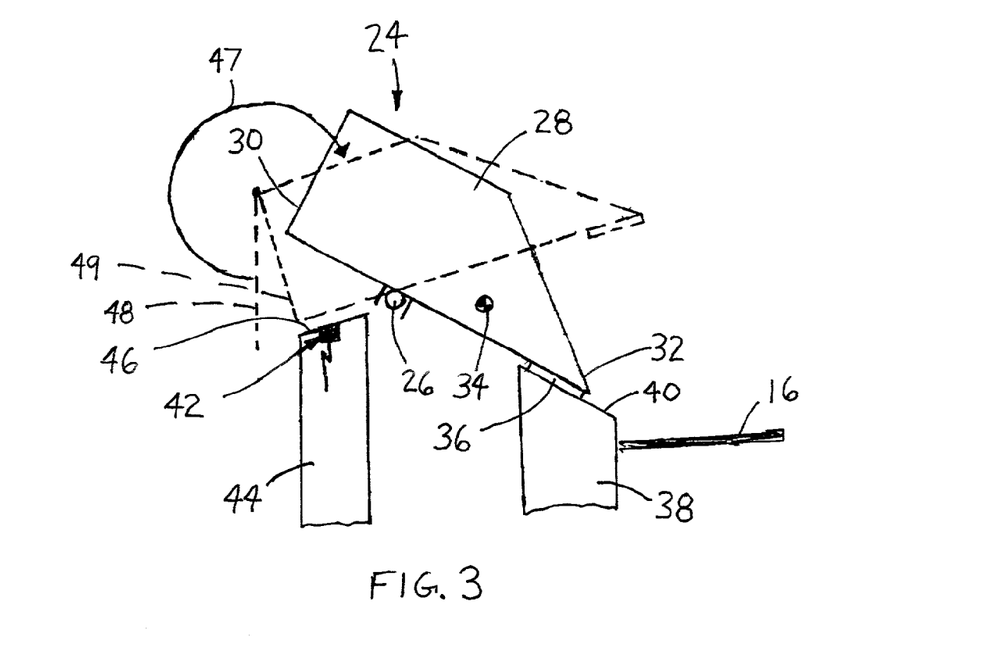
FIG. 3 is an enlarged detail of a dumping station for use with the stock order filling apparatus of FIG. 2.

The bin 28 is biased toward the dump mode under the force of gravity. As shown in FIG. 3, the bin 28 may have a center of gravity 34 that is laterally offset with respect to the support shaft 26. As a result, the bin 28 is automatically biased, under the force of gravity, toward the dump position. In addition, one or more weights 36 may be attached to the bin 28 near the discharge end 32 to further shift the bin center of gravity 34 toward the discharge end 32, thereby increasing the bias force toward the dump position. The bin 28 may be positioned with respect to the shaft 26 and weighted such that the center of gravity 34 is sufficiently offset to counteract the weight of articles deposited in the article receiving end 30 of the bin 28.

The dumping station 24 may include a dump pedestal 38, which provides a stop as the rotatable bin 28 illustrated in FIG. 3 moves to the dump position. The dump pedestal 38 engages the discharge end 32 of the bin 28 so that the discharge end 32 is located proximal to the conveyor 16. The dump pedestal 38 may include a slanted top surface 40 oriented to direct articles exiting the bin 28 toward the conveyor 16. The dump pedestal 38 may be provided as a rail extending along the length of the support shaft 26 to provide stops for a plurality of bins 28.

A releaseable latch 42 is provided for retaining the bin 28 in the pick mode against the force of gravity. According to the embodiment of FIG. 3, the latch 42 is carried by a pick pedestal 44 having an angled top surface 46 positioned and oriented to engage a bottom surface of the bin 28 when in the pick position. Similar to the dump pedestal 38, the pick pedestal 44 may extend along the entire length of the support shaft 26 and carry latches 42 for a plurality of bins 28. The latch 42 may be provided in the form of an electromagnet (as shown in FIG. 3) that may be energized to attract magnetic material provided with the bin 28. Power to the electromagnet may be stopped in response to a release signal, whereby the bin 28 is allowed to rotate to the dump position under the force of gravity. While the latch 42 is illustrated herein as an electromagnet, it will be appreciated that any known magnetic, mechanical, or other releaseable latch may be used without departing from the scope of the present invention.

Figure 4:
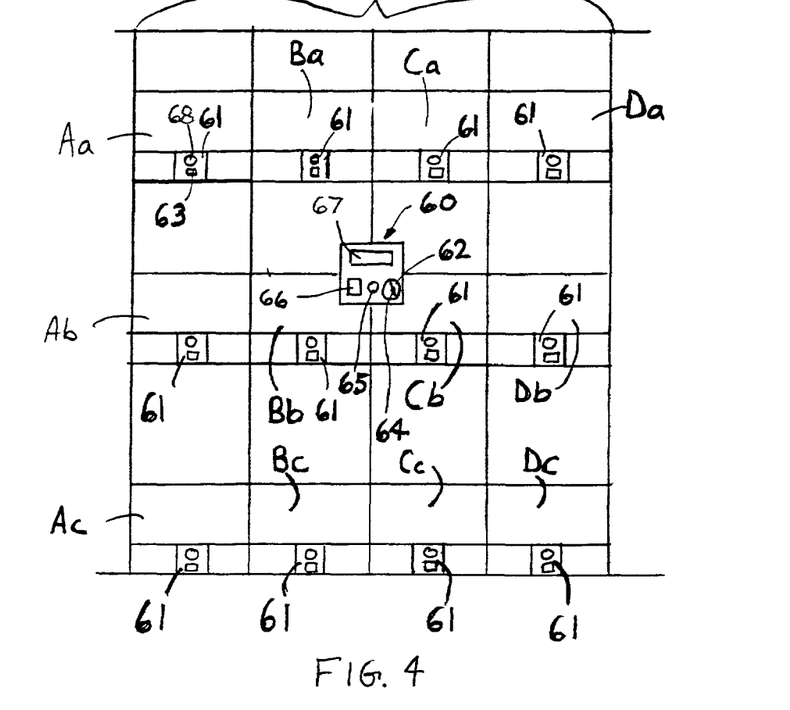
FIG. 4 is a schematic illustration of a section of the stock order filling apparatus showing primary assignments of rack sections to dumping stations.
Figure 5:
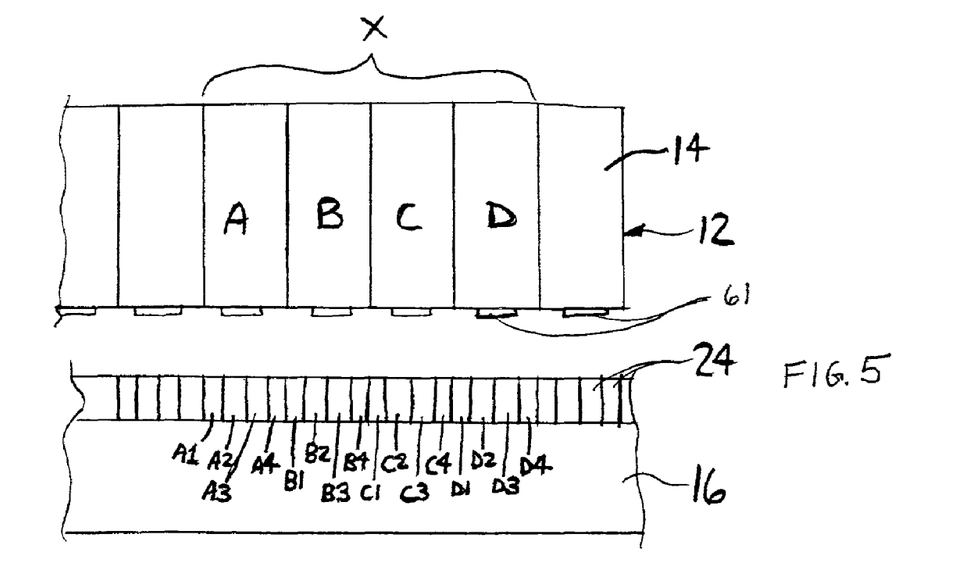
FIG. 5 is a schematic illustration of a central indicator positioned in a rack section.

Each dumping station 24 is associated with a specific section of the racks 12. As best shown in FIGS. 4 and 5, a section X of the racks 12 may include shelf sections A, B, C, and D, each shelf section including three shelves, referred to herein as shelves Aa, Ab, Ac, Ba, Bb, Bc, Ca, Cb, Cc, Da, Db, and Dc. One or more dumping stations 24 may be assigned to each shelf section. For example, shelf section A may be associated with dumping stations A1, A2, A3, and A4. Likewise, shelf sections B, C, and D may be associated with one or more dumping stations 24. Each of the dumping stations may have a unique identifier, such as a name or color, so that a stock worker will quickly learn where specific dumping stations are located. As illustrated in FIG. X, for example, dumping station A1 may be named "alpha," dumping station A2 named "beta," dumping station A3 named "charlie," dumping station A4 named "delta," and so on. Furthermore, the names may be established by the stock workers to increase memory retention by the stock worker of the location of the individual dumping stations.

A picking interface may be provided to direct a stock worker to pick articles from the desired shelf and deposited them in a selected dumping station, and to receive confirmation from a stock worker that a pick has been completed. As used herein, the phrases "picking operation" and "pick" are interchangeable, and refer to the process of selecting articles as instructed and depositing them in the assigned dumping station. In the embodiment illustrated at FIG. 4, the pick interface includes a central indicator 60 for each rack section, such as rack section X, and a shelf indicator 61 associated with each shelf. The central indicator 60 includes a number display 66 for indicating the quantity of article to be pulled and a dumping station name display 67 which identifies which dumping station 24 into which the picked articles are to be deposited. Each shelf indicator 61 includes a light 68 which may be illuminated to attract the attention of the stock worker. During operation, when a selected article is to be picked, the central indicator 60 displays the quantity and dumping station name, while the light 68 of the desired shelf indicator 61 is illuminated. The worker may then quickly select the desired quantity of the article from the selected shelf and deposit the article into the assigned dumping station.

A controller 50 (FIG. 1) may be provided having a memory and a processor operably connected to the releaseable latches 42, the central indicators 60, and the shelf indicators 61 for directing the stock worker to fill an order. The processor is also connected to order input means (not shown) for entering information regarding orders to be filled. The processor generates a sequence of picking instructions based on the orders so entered. Accordingly, the processor is adapted to assign specific dumping stations 24 to each pick. The processor further sequentially operates the central and shelf indicators 60, 61 to direct the stock worker through a series of picks, each pick fulfilling all or part of an order. During a picking operation, the processor illuminates the light 68 of a shelf indicator 61 associated with the desired article. The processor also activates the number display 66 and dumping station display 67 of the appropriate central indicator 60 to indicate the quantity of the article to be picked and to identify the assigned dumping station 24 into which the article(s) should be deposited. In response, the stock worker pulls the specified quantity of the article and deposits the article(s) into the assigned dumping station 24. Once a picking operation is complete, the processor repeats the process for a subsequent picking operation by assigning a new dumping station 24 and illuminating the same or different indicators 60, 61.

Each shelf indicator 61 may further have a quitting switch 63 that is operable to send a pick complete signal to the processor, thereby confirming that a pick has been completed. As best shown in FIG. 4, the quitting switch 63 is provided next to the light display of each shelf indicator 61. When a current order has been picked from a shelf, the stock worker actuates the quitting switch 63 to deliver the pick complete signal. The processor may be programmed to interpret a pick complete signal from a subsequent picking operation as an indication that the article pulled during the immediately preceding picking operation has been placed in the assigned dumping station 24. The pick complete signal will also indicate that the articles have been pulled for the current picking operation and therefore the processor will illuminate the indicators 60, 61 for the next picking operation. In the absence of a pick complete signal, the processor may initiate the next picking operation after a delay period such as, for example, four seconds.

Each central indicator 60 may further include a direction display 62 for informing the stock worker of the position of the shelf holding article for the next picking operation. As best shown in FIG. 4, the direction display 62 is operable to show an arrow 64 or other indicator directing the stock worker toward the shelf 14 to be used in the next picking operation. By providing advance information regarding the next pick, the stock worker may efficiently deposit the articles for the current pick in the assigned dumping station and immediately begin walking toward the general area of the shelf 14 to be used in the next pick, thereby reducing the amount of time needed between subsequent picking operations. Each central indicator 60 further preferably includes a multi-purpose exception button 65 which may be used, for example, to repeat a previous picking instruction or to indicate that a particular item is out of stock.

Figure 6:
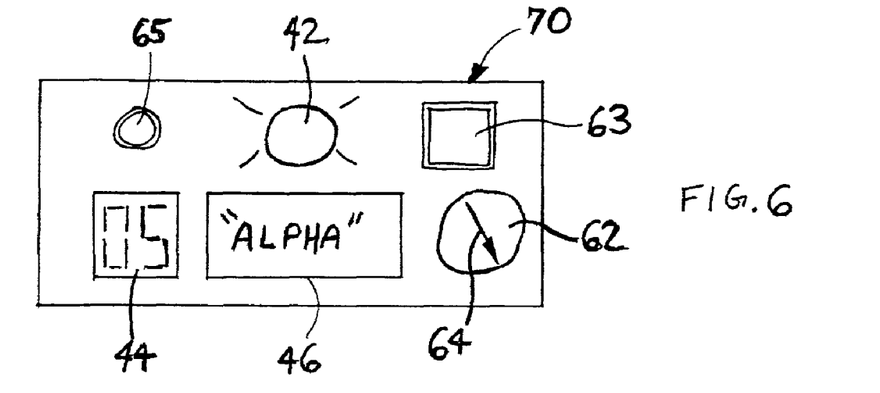
FIG. 6 is a schematic illustration of an alternative integrated shelf indicator adapted to be used with each shelf of a rack.

In an alternative pick interface embodiment, the central indicator 60 may be eliminated and an integrated shelf indicator 70 may be provided for each shelf. As best shown in FIG. 6, each integrated shelf indicator 70 incorporates the number display 66, the dumping station display 67, the light display 68, the direction display 62, the quitting switch 63, and the multi-purpose exception button 65 into a single indicator.

Once all of the parts of a specific order are deposited into various dumping stations 24 after a series of picks, the processor sequentially delivers a release signal to each latch 42 associated with those dumping stations to release selected bins to the dump position, thereby discharging articles onto substantially the same section of conveyor 16. As the conveyor advances, each dumping station 24 associated with a particular order is released to discharge its contents onto the conveyor. Once the articles from a bin 28 have been discharged onto the conveyor 16, the dumping station associated with the bin is available for assignment. As the section of conveyor 16 advances, downstream dumping stations 24 associated with the same order are also actuated to deposit additional article onto the same section of conveyor 16. Ultimately, when all of the articles for an order are discharged onto the same section of the conveyor 16, the order is advanced to the discharge end 20 of the conveyor where the articles may be deposited into the tote 22 or otherwise processed for packing and shipping.

The pick interfaces and steps for operating the order filling system described herein are examples only, as other types of stock order filling systems and methods may be used with the dumping stations 24 without departing from the teachings of the present invention.

Figure 7:
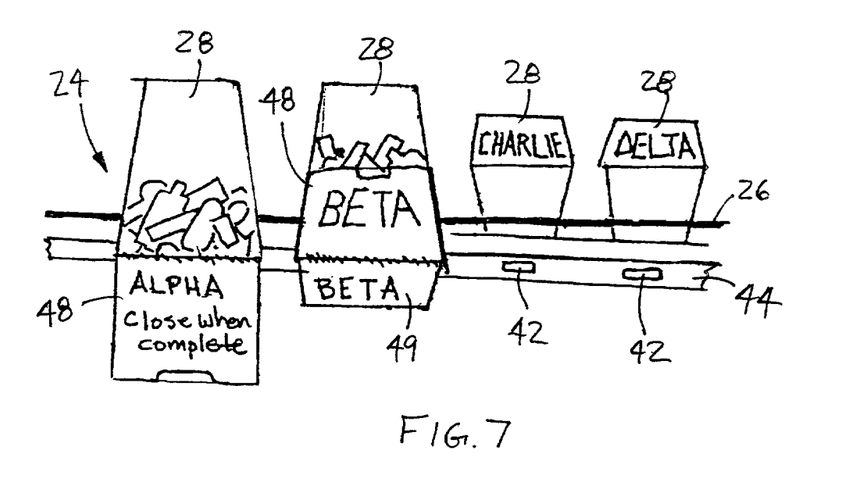
FIG. 7 is a partially schematic perspective view of four of the dumping stations shown in FIG. 3.

Each dumping station 24 may further include a status indicator, such as a lid 48, that provides an easily identifiable indication of whether the dumping station is "active" or "inactive." As best shown in FIGS. 3 and 7, the lid 48 is pivotally attached to a rear wall 49 of the bin 28 for movement between open (active) and closed (inactive) positions. When in the open position, the lid 48 allows unobstructed access to the interior of the bin 28. The open position is illustrated by the left-most bin 28 named "alpha" in FIG. 7. When a bin 28 has been filled with articles, the lid 48 may be rotated (in the direction indicated by arrow 47 in FIG. 3) to the closed position in which the lid 48 overlies at least a portion of the receive end 30 of the bin. A lid 48 in the closed position is illustrated by the second left-most bin 28 named "beta" in FIG. 7. Accordingly, when the lid 48 is in the open position, it provides a visual indication that the bin 28 is "active" (i.e., more articles are to be deposited into the bin). Conversely, when the lid 48 is in the closed position, a visual indication is provided that the bin 28 is "inactive" (i.e., no further articles are to be deposited into the bin). Bins "alpha" and "beta" shown in FIG. 7 are both in the pick position, so that the bins are rotated away from the conveyor 16. Bins "Charlie" and "Delta" of FIG. 7 are in the dump position. In the current embodiment, the lid 48 is manually placed in the open and closed positions.

In operation, after a bin 28 has discharged its contents onto the conveyor 16, it is available for reassignment. In the embodiment of FIGS. 2, 3, and 7, a stock worker may manually rotate the bin 28 from the dump position (dump mode) to the pick position (pick mode), so that the latch 42 secures the bin 28 in the pick position. At approximately the same time, the stock worker may also manually rotate the lid 48 from the closed position to the open position to provide a readily visible indication that the bin 28 is available for an order. The processor directs the stock worker to select certain articles and deposit them in an assigned bin 28. At any one time, there may be multiple dumping stations available to the stock worker, so the lid 48 in the open position will help the stock worker narrow the available bin options to those having a lid in the open position. The processor indicates the picking location, quantity, and destination bin for each part of the order. Each order may consist of multiple pieces and types of articles to be placed in the same bin 28. After all the picks have been completed for a specific bin 28, the processor indicates to the stock worker that the order is complete. The stock worker may then close the lid 48 on the bin 28 of the current dumping station 24 to indicate that the dumping station is "inactive," thereby removing it as an option for additional picks. When the dumping station 24 is subsequently released to the dump position, the lid 48 will remain in the closed position until the dumping station is reassigned to a new order, at which time the stock worker may manually place the lid 48 in the open position as the bin 28 is placed in the pick position.

In the embodiment of FIGS. 2, 3, and 7, the lid 48 may also assist in holding and moving the bin 28 to the pick and dump positions in addition to providing visual indications regarding the status of the bin. When a bin 28 is placed in the pick position and the lid 48 is rotated to the open position, the bin center of gravity 34 is shifted toward the article receiving end 30. Consequently, the lateral offset from the support shaft 26 and the bias force toward the dump position are reduced. Once a complete order has been deposited into the bin 28, rotation of the lid 48 to the closed position will shift the bin center of gravity 34 back toward the discharge end 32 to help offset the weight of the articles in the bin. As a result, the bias force toward the dump position is increased.

Figure 8:
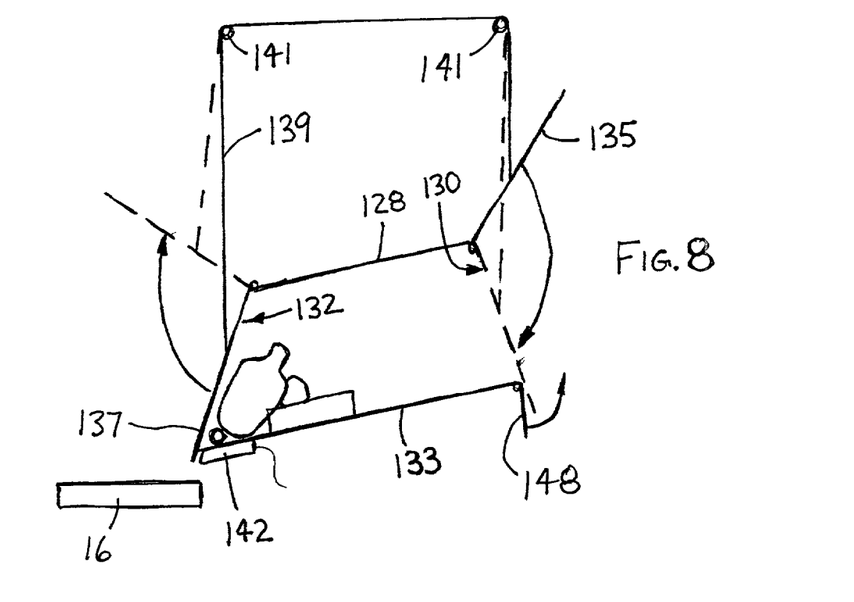
FIG. 8 is a schematic side elevation view of an alternative embodiment of a dumping station in accordance with the teachings of the present invention.
Figure 9:
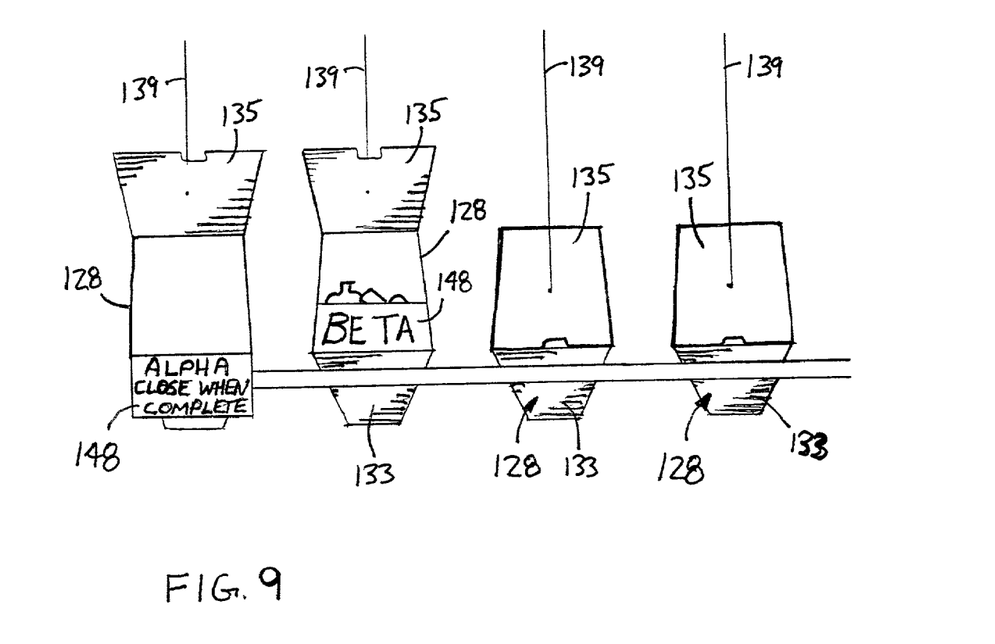
FIG. 9 is a partially schematic perspective view of four of the dumping stations shown in FIG. 8.

An alternative dump station embodiment is illustrated at FIGS. 8 and 9. In this embodiment, a bin 128 is fixed against rotation and has a receive end 130 and a discharge end 132. A bottom wall 133 of the bin 128 is inclined with the discharge end 132 positioned below the receive end 130, so that articles placed at the receive end 130 automatically move toward the discharge end 132 under gravity. The bin 128 includes a rear flap 135 pivotally attached to the bin 128 and movable between a closed position, in which the rear flap 135 closes off the receive end 130, and an open position, in which the front flap 135 is rotated away from the receive end 130. A front flap 137 is also pivotally attached to the bin 128 and movable between a closed position, in which the front flap 137 closes off the discharge end 132, and an open position, in which the front flap 137 is rotated away from the discharge end 132. A releasable latch 142 is positioned to engage the front flap 137 when in the closed position. The latch 142 is preferably provided as an electromagnet.

A cable 139 connects the front flap 137 to the rear flap 135 so that the flaps move in response to each other. The cable may pass over pulleys 141 or any other support means which allows free travel of the cable. As illustrated in dashed lines at FIG. 8, the front flap 137 moves to the open position when the rear flap 135 is in the closed position. Conversely, the front flap 137 moves to the closed position when the rear flap 135 is in the open position, as shown in solid lines at FIG. 8. The rear flap 135 is biased under gravity toward the closed position and has a greater mass than the front flap 137, so that the front flap 137 is biased toward the open position.

In operation, the rear flap 135 is manually placed in the open position, thereby placing the front flap 137 in the closed position, which corresponds to a pick mode of the bin 128. The latch 142 engages the front flap 137 so that it remains in the closed position, against the weight of the rear flap 135 and any articles placed in the bin 128 that may push against the front flap 137. A controller is operably coupled to the latch 142 and has a processor that generates a release signal to release the latch. In response to the release signal, the bin 128 switches to the dump mode, wherein the rear flap moves to the closed position under force of gravity, the greater mass of the rear flap pulling the front flap to the open position, thereby to discharge articles from the bin 128.

The bin 128 of FIGS. 8 and 9 may further include a lid 148 for indicating whether the dumping station is "active" or "inactive." As best shown in FIG. 9, the lid 148 is pivotally attached to the bottom wall 133 of the bin 128 near the receive end 130, and is movable between an open and closed positions, illustrated by the left-most and second left-most bins 128 (i.e., "alpha" and "beta," respectively) of FIG. 9. In the open position, the lid 148 allows unobstructed access to the interior of the bin 128, thereby providing a visual indication that more articles are to be placed in the bin. In the closed position, the lid 148 overlies at least a portion of the receive end 130, thereby providing a visual indication that no more articles are to be placed in the bin 128. The lid 148 may be manually placed in either the open or closed positions.

Figure 10:
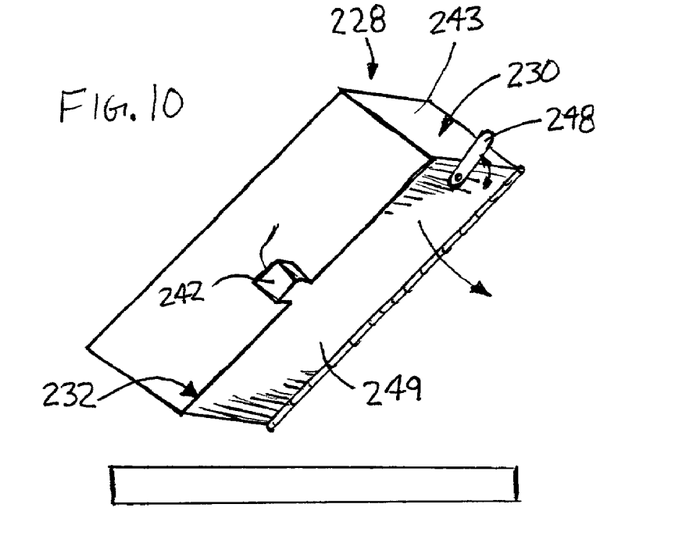
FIG. 10 is a partially schematic perspective view of a further alternative embodiment of a dumping station in accordance with the teachings of the present invention.
Figure 11:
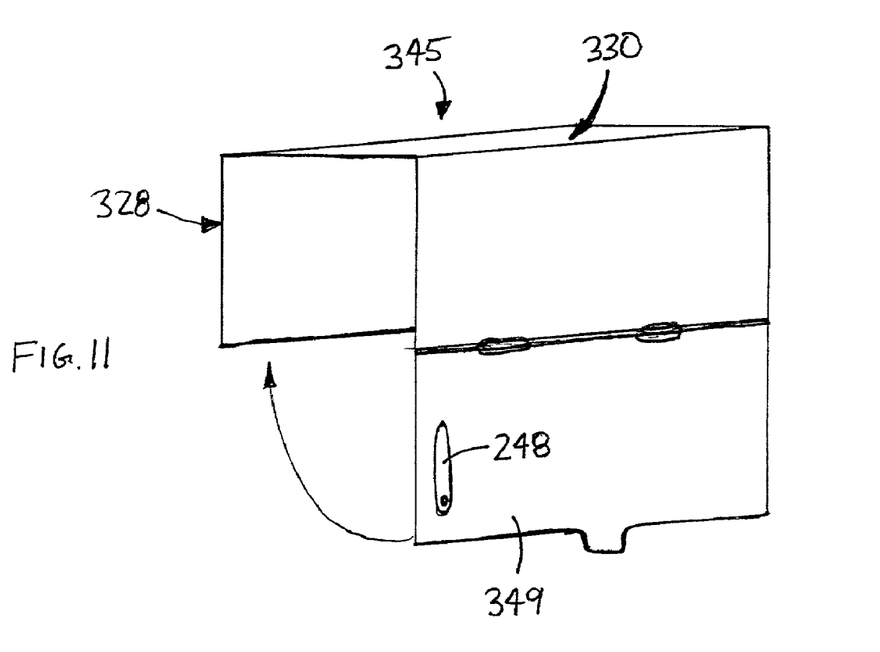
FIG. 11 is a partially schematic perspective view of yet another alternative embodiment of a dumping station in accordance with the teachings of the present invention.

Still further alternative dump station embodiments are illustrated at FIGS. 10 and 11. In FIG. 10, a bin 228 includes a hinged bottom wall 249. The bottom wall 249 is rotatable between a closed position (pick mode), in which the bottom wall 249 closes off a bin discharge end 232, and an open position (dump mode), in which the bottom wall 249 is rotated away from the discharge end 232. The bottom wall 249 is biased toward the open position under force of gravity. A releasable latch 242 is positioned to engage the bottom wall 249 when in the closed position, against the force of gravity on the bottom wall 249 and any articles placed in the bin 228. A controller is operably coupled to the latch 242 and has a processor programmed to send a release signal to the latch 242.

In operation, the bottom wall 248 may be manually placed in the closed position and secured by the latch 242. When the controller sends the release signal, the latch 242 is released to allow the bottom wall 249 to move to the open position under the force of gravity, so that the articles are discharged from the bin and onto the conveyor 216.

In the bin of FIG. 10, the bottom wall 249, when in the closed position, is inclined so that the receive end 230 is located at a rear face 243 of the bin 228.

The bin 328 of FIG. 11 is substantially identical to that of FIG. 10, except the bottom wall 349 is substantially horizontal in the closed position. As a result, the receive end 330 is located at a top face 345 of the bin 328.

The bins 228, 328 of FIGS. 10 and 11 include an alternative status indicator in the form of a handle 248. The handle 248 is pivotally attached to the bottom wall of the bin, and is movable between active and inactive positions. In the active position (illustrated at FIG. 10), the handle 248 extends beyond a periphery of the bottom wall to be visible to a stock worker standing at a rear of the bin. In the inactive position (illustrated at FIG. 11), the handle 248 is retracted within the periphery of the bottom wall so that it is not visible to the stock worker. The handle 248 may be manually moved between the active and inactive positions.

Although certain methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A dumping station for use in a stock order filling system, the dumping station comprising:
   a collection area including a conveyor;
   a bin disposed adjacent the conveyor, the bin having a receiving end including an open top, a discharge end including an open front, the open top in the receiving end adapted to receive articles, the bin having a dump mode, in which articles in the bin are discharged from the open front in the discharge end and onto the collection area, and a pick mode, in which the articles are retained in the receiving end of the bin, the bin being biased under force of gravity toward the dump mode, the bin being rotatable about an axis, the bin having a center of gravity laterally offset from the axis toward the discharge end;
   an electronically controllable releasable latch selectively engageable with the bin, the latch selectively securing the bin in the pick mode against the force of gravity, the latch being responsive to a release signal to release the bin; and
   a controller operably coupled to the latch and having a processor programmed to generate the release signal to release the latch, wherein upon the latch releasing the bin, the bin automatically switches from the pick mode to the dump mode under the force of gravity by rotating about the axis thereby to discharge the articles in the bin directly onto the conveyor;
   wherein the processor is programmed to generate the release signal as a selected area of the conveyor passes the dumping station.

2. The dumping station of claim 1, in which the releasable latch comprises an electromagnet.

3. The dumping station of claim 1, in which the processor is programmed to assign pick orders to the dumping station.

4. The dumping station of claim 1, further comprising a lid attached to the receiving end of the bin, the lid being movable between an active position away from the open top, to provide a visual indication that more articles are to be placed in the bin, and an inactive position covering at least a portion of the open top, to provide a visual indication that no more articles are to be placed in the bin.

5. The dumping station of claim 1, further comprising a support shaft, wherein the bin is pivotably mounted on the support shaft, the bin having a center of gravity laterally offset from the support shaft so that the bin is biased to a dump position corresponding to the bin dump mode, the bin being rotatable to a pick position corresponding to the bin pick mode.

6. The dumping station of claim 5, in which a weight is attached to the bin near the discharge end to laterally shift the center of gravity of the bin toward the discharge end.

7. The dumping station of claim 5, further comprising a dump pedestal positioned to engage the bin in the dump position, and a pick pedestal positioned to engage the bin in the pick position, the pick pedestal carrying the releasable latch.

8. The dumping station of claim 7, in which the dump pedestal is oriented to direct articles onto the collection area.

9. The dumping station of claim 1, in which the bin is manually placed in the pick mode.

10. A dumping station for use in a stock order filling system having a collection area, the dumping station depositing articles onto the collection area, the dumping station comprising:
a stationary support permanently fixed against displacement relative to the collection area;
a bin hingedly mounted to the stationary support for rotational motion relative to the stationary support, the bin comprising a receiving end including an open top, a discharge end including an open front, and a center of gravity laterally offset from the stationary support toward the discharge end to bias the bin under force of gravity toward a dump position, in which the discharge end is proximal to the collection area and articles placed in the bin exit the open front in the discharge end of the bin;
a releasable latch positioned to hold the bin against the force of gravity when manually placed in a pick position, in which articles placed in the receiving end of the bin remain in the receiving end of the bin, the latch being releasable to allow the bin to pivot back toward the dump position, the latch being responsive to a release signal to release the bin; and
a controller operably coupled to the latch and having a processor programmed to generate the release signal to release the latch, wherein the bin automatically moves from the pick position to the dump position under the force of gravity thereby to discharge articles from the open front in the discharge end of the bin onto the collection area.

11. The dumping station of claim 10, in which the releasable latch comprises an electromagnet.

12. The dumping station of claim 10, further comprising a dump pedestal positioned to engage the bin discharge end in the dump position, and a pick pedestal positioned to engage the bin in the pick position, wherein the pick pedestal carries the releasable latch.

13. The dumping station of claim 12, in which the dumping pedestal is oriented to direct articles onto the collection area.

14. The dumping station of claim 10, in which the processor is programmed to assign pick orders to the dumping station.

15. The dumping station of claim 10, in which the processor is programmed to generate the release signal as a selected area of the conveyor passes the dumping station.

16. The dumping station of claim 10, in which the support is positioned below the bin.

17. The dumping station of claim 10, in which a weight is attached to the bin near the discharge end to laterally shift the center of gravity of the bin toward the discharge end.

18. The dumping station of claim 10, further comprising a lid attached to the receiving end of the bin, the lid being manually movable between an active position away from the opening, to provide a visual indication that more articles are to be placed in the bin, and an inactive position covering at least a portion of the opening, to provide a visual indication that no more articles are to be placed in the bin.

19. A dumping system for use in a stock order filling system having a collection area, the dumping system comprising:
a first bin having a receiving end including an open top, a discharge end including an open front, the open top in the receiving end adapted to receive a first set of articles, the first bin having a dump mode, in which the first set of articles in the first bin are discharged from the open front in the discharge end and onto the collection area, and a pick mode, in which the first set of articles are retained in the first bin, the first bin being biased under force of gravity toward the dump mode;
a first releasable latch positioned to retain the first bin in the pick mode against the force of gravity, the first releasable latch being responsive to a first release signal to release the first bin;
a second bin having a receiving end including an open top, a discharge end including an open front, the open top in the receiving end adapted to receive a second set of articles, the second bin having a dump mode, in which the second set of articles in the second bin are discharged from the open front in the discharge end and onto the collection area, and a pick mode, in which the second set of articles are retained in the second bin, the second bin being biased under force of gravity toward the dump mode;
a second releasable latch positioned to retain the second bin in the pick mode against the force of gravity, the second releasable latch being responsive to a second release signal to release the second bin; and
a controller operably coupled to the first latch and the second latch and having a processor programmed to generate the first release signal to release the first latch and the second release signal to release the second latch, wherein the first bin and the second bin automatically switch from the pick mode to the dump mode under the force of gravity thereby to discharge the first set of articles in the first bin and the second set of articles in the second bin onto the collection area;
wherein the collection area comprises a conveyor, and the processor is programmed to generate the first release signal as a selected area of the conveyor passes the first bin to dump the first set of articles onto the selected area and is programmed to generate the second release signal as the selected area of the conveyor passes the second bin to dump the second set of articles onto the selected area.

20. The dumping station of claim 1, further comprising a storage rack disposed adjacent to the bin.

21. The dumping station of claim 20, wherein the storage rack includes an indicator.

22. The dumping station of claim 21, wherein the controller is operably coupled to the indicator, wherein the controller directs the indicator to indicate the articles to be picked from the shelf section.

23. A dumping station for use in a stock order filling system, the dumping station comprising:
- a conveyor;
- a stationary support permanently fixed against displacement relative to the conveyor;
- a bin pivotably supported on top of the stationary support, the bin comprising a bottom wall, a rear wall fixed to the bottom wall, opposing sidewalls fixed to the bottom and rear walls, an open top, and an open front,
- the bin pivotable relative to the conveyor between a pick mode for receiving articles through the open top, and wherein a first portion of the bottom wall that is located adjacent the open front is disposed above a second portion of the bottom wall that is located adjacent the rear wall, and a dump mode for discharging articles through the open front, and wherein the second portion of the bottom wall is positioned above the first portion of the bottom wall;
- a releasable latch selectively engageable with the bin, the latch selectively securing the bin in the pick mode against the force of gravity, the latch being responsive to a release signal to release the bin; and
- a controller operably coupled to the latch and having a processor programmed to generate the release signal to release the latch, wherein upon the latch releasing the bin, the bin automatically switches from the pick mode to the dump mode under the force of gravity.

* * * * *